United States Patent
Sakamoto (10) Patent No.: US 12,478,792 B2
(45) Date of Patent: Nov. 25, 2025

(54) DEFIBRILLATING ELECTRICAL APPARATUS AND DEFIBRILLATION SIGNAL GENERATION METHOD

(71) Applicant: KANEKA CORPORATION, Osaka (JP)

(72) Inventor: Shinichiro Sakamoto, Settsu (JP)

(73) Assignee: KANEKA CORPORATION, Osaka (JP)

( * ) Notice: Subject to any disclaimer, the term of this patent is extended or adjusted under 35 U.S.C. 154(b) by 427 days.

(21) Appl. No.: 17/925,476

(22) PCT Filed: May 19, 2021

(86) PCT No.: PCT/JP2021/019043
§ 371 (c)(1),
(2) Date: Nov. 15, 2022

(87) PCT Pub. No.: WO2021/251088
PCT Pub. Date: Dec. 16, 2021

(65) Prior Publication Data
US 2023/0181917 A1   Jun. 15, 2023

(30) Foreign Application Priority Data
Jun. 8, 2020   (JP) .................. 2020-099558

(51) Int. Cl.
*A61N 1/39* (2006.01)
*A61B 5/33* (2021.01)
*A61B 5/352* (2021.01)
*A61N 1/05* (2006.01)

(52) U.S. Cl.
CPC .............. *A61N 1/3987* (2013.01); *A61B 5/33* (2021.01); *A61B 5/352* (2021.01); *A61N 1/0563* (2013.01)

(58) Field of Classification Search
CPC .................................................. A61N 1/3987
See application file for complete search history.

(56) References Cited

U.S. PATENT DOCUMENTS

| 5,207,219 A | 5/1993 | Adams et al. |
| 5,280,792 A * | 1/1994 | Leong ............. A61B 5/7267 706/924 |
| 2023/0211154 A1* | 7/2023 | Kojima ............. A61N 1/3987 607/5 |

FOREIGN PATENT DOCUMENTS

| JP | 6-178817 A | 6/1994 |
| JP | 2018-68981 A | 5/2018 |

OTHER PUBLICATIONS

International Search Report (PCT/ISA/210) issued in PCT/JP2021/019043, dated Aug. 10, 2021.

* cited by examiner

*Primary Examiner* — George R Evanisko
(74) *Attorney, Agent, or Firm* — Birch, Stewart, Kolasch & Birch, LLP

(57) ABSTRACT

The defibrillating electrical apparatus is controlled such that the enabling signal generator generates an enabling signal for the (n+1)-th R wave ($R_{n+1}$) when and after a first time interval ($T_1$) as a time interval from the n-th R wave ($R_n$) to the (n+1)-th R wave ($R_{n+1}$) of an electrocardiographic waveform (50) exceeds a first predetermined time period, if the first time interval ($T_1$) is equal to or less than the first predetermined time period, the defibrillating electrical apparatus is controlled such that the enabling signal generator generates an enabling signal for the (n+2)-th R wave ($R_{n+2}$) when and after a second time interval ($T_2$) as a time interval from the n-th R wave ($R_n$) to the (n+2)-th R wave ($R_{n+2}$) of an electrocardiographic waveform (50) exceeds a second predetermined time period.

8 Claims, 5 Drawing Sheets

DEFIBRILLATING ELECTRICAL APPARATUS AND DEFIBRILLATION SIGNAL GENERATION METHOD

TECHNICAL FIELD

The present invention relates to a defibrillating electrical apparatus and a defibrillation signal generation method.

BACKGROUND ART

Treatment for arrythmia such as atrial fibrillation or ventricular fibrillation involves defibrillation of restoring a normal heart rhythm by means of electrostimulation. Defibrillation is executed with use of an automated external defibrillator (AED), an implantable cardioverter defibrillator (ICD), a defibrillation paddle system, or a defibrillation catheter system.

Treatment for atrial fibrillation particularly needs voltage application during an absolute refractory period to avoid reaction of ventricular muscle. Stimulation at any time other than the absolute refractory period may cause reaction of ventricular muscle, which may lead to ventricular fibrillation. The defibrillation catheter system thus needs to be configured to apply voltage in synchronization with an R wave.

Patent Document 1 discloses, as an exemplary defibrillation catheter system used for such treatment, a catheter system including a defibrillation catheter configured to be inserted to a cardiac cavity for execution of defibrillation, a power source apparatus configured to apply direct voltage to electrodes of the defibrillation catheter, and an electrocardiograph.

RELATED ART DOCUMENTS

Patent Documents

Patent Document 1: JP-A-2018-68981

SUMMARY OF THE INVENTION

Technical Problem

However, the intracardiac defibrillation catheter system described in Patent Document 1 is not configured to apply voltage for defibrillation to a patient having a narrow interval between an R wave and a subsequent R wave. In recent years, there have thus been demands for development of a defibrillation apparatus including a novel enabling signal generator mechanism.

The present invention has been achieved in view of the above circumstances, and it is an object thereof to provide a novel defibrillating electrical apparatus and a defibrillation signal generation method.

Solutions to the Problems

The present invention provides a defibrillating electrical apparatus that successfully solves the above problem and is configured as follows.

[1] A defibrillating electrical apparatus comprising:
an electrocardiographic waveform input unit; and
an enabling signal generator configured to generate an enabling signal for enabling voltage application for defibrillation;
the defibrillating electrical apparatus being configured to satisfy a necessary condition 1 or a necessary condition 2, wherein
an n-th R wave, an (n+1)-th R wave, and an (n+2)-th R wave are detected in a mentioned order, and n is an integer equal to or more than one,
(The Necessary Condition 1)
the defibrillating electrical apparatus is controlled such that the enabling signal generator generates an enabling signal for the (n+1)-th R wave when and after a first time interval as a time interval from the n-th R wave to the (n+1)-th R wave of an electrocardiographic waveform exceeds a first predetermined time period,
(The Necessary Condition 2)
if the first time interval is equal to or less than the first predetermined time period, the defibrillating electrical apparatus is controlled such that the enabling signal generator generates an enabling signal for the (n+2)-th R wave when and after a second time interval as a time interval from the n-th R wave to the (n+2)-th R wave of an electrocardiographic waveform exceeds a second predetermined time period.

An electrocardiographic waveform includes an R wave and a T wave appearing after the R wave, and the R wave and the T wave have an interval therebetween, which is typically shorter than an interval between an R wave and a subsequent R wave. The defibrillating electrical apparatus thus allows the T wave included in the R wave detected under the necessary condition 1 to be reliably excluded from a voltage application target. Furthermore, the defibrillating electrical apparatus facilitates selection of an appropriate R wave as a voltage application target, from R waves having a narrow interval therebetween under the necessary condition 2, and enables voltage application for defibrillation.

The present invention further provides a defibrillation electrical apparatus of [2]-[10] below.

[2] The defibrillating electrical apparatus according to [1], the defibrillating electrical apparatus further comprising:
a power source unit configured to generate applied voltage; wherein
the defibrillating electrical apparatus is controlled such that the enabling signal generator generates an enabling signal when and after a necessary condition 3 is further satisfied under the necessary condition 1 or 2,
(The Necessary Condition 3)
the power source unit terminates charging voltage necessary for voltage application.

[3] The defibrillating electrical apparatus according to [1] or [2], wherein
the defibrillating electrical apparatus is controlled such that the enabling signal generator generates an enabling signal when and after a necessary condition 4 is further satisfied under the necessary condition 1 or 2,
(The Necessary Condition 4)
voltage for defibrillation is not applied to an R wave immediately before the R wave as a target of an enabling signal for defibrillation.

[4] The defibrillating electrical apparatus according to any one of [1] to [3], wherein the first predetermined time period and the second predetermined time period are 100 milliseconds or more and 300 milliseconds or less.

[5] The defibrillating electrical apparatus according to any one of [1] to [4], wherein the first predetermined time period and the second predetermined time period are equal to each other.

[6] The defibrillating electrical apparatus according to any one of [1] to [5], wherein
the first time interval corresponds to a time interval from a peak of the n-th R wave to a peak of the (n+1)-th R wave of the electrocardiographic waveform, and
the second time interval corresponds to a time interval from the peak of the n-th R wave to a peak of the (n+2)-th R wave of the electrocardiographic waveform.

[7] The defibrillating electrical apparatus according to any one of [1] to [5], wherein
the first time interval corresponds to a time interval from a time point when waveform height of the n-th R wave of the electrocardiographic waveform exceeds a first predetermined value to a time point when waveform height of the (n+1)-th R wave exceeds the first predetermined value,
the second time interval corresponds to a time interval from a time point when the waveform height of the n-th R wave of the electrocardiographic waveform exceeds the first predetermined value to a time point when waveform height of the (n+2)-th R wave exceeds the first predetermined value, and
the third predetermined time period is shorter than a time interval from a beginning to the peak of the R wave.

[8] The defibrillating electrical apparatus according to any one of [1] to [5], wherein
the first time interval corresponds to a time interval from a time point when waveform height of the n-th R wave of the electrocardiographic waveform falls below a second predetermined value to a time point when waveform height of the (n+1)-th R wave falls below the second predetermined value,
the second time interval corresponds to a time interval from a time point when the waveform height of the n-th R wave of the electrocardiographic waveform falls below the second predetermined value to a time point when waveform height of the (n+2)-th R wave falls below the second predetermined value, and
the fourth predetermined time period is shorter than a time interval from the peak to an end of the R wave.

[9] The defibrillating electrical apparatus according to any one of [1] to [8], wherein
the defibrillating electrical apparatus is controlled to generate
a sign status signal for sign impartment to the (n+1)-th R wave when and after the first time interval exceeds the first predetermined time period, and
a sign status signal for sign impartment to the (n+2)-th R wave when and after the second time interval exceeds the second predetermined time period.

[10] The defibrillating electrical apparatus according to any one of [1] to [9], wherein the defibrillating electrical apparatus is an intracardiac defibrillating electrical apparatus.

The present invention further provides an intracardiac defibrillation catheter system as in [11] described below.

[11] An intracardiac defibrillation catheter system comprising:
a catheter configured to be inserted to a cardiac cavity, the catheter having a distal end, a proximal end, and a plurality of electrodes provided at a distal portion of the catheter; and
the defibrillating electrical apparatus according to any one of [1] to [10], the defibrillating electrical apparatus being configured to apply voltage to the plurality of electrodes.

The present invention further provides a defibrillation signal generation method as in [12] described below.

[12] A defibrillation signal generation method comprising:
determining whether or not a first time interval as a time interval from an n-th R wave to an (n+1)-th R wave of an electrocardiographic waveform exceeds a first predetermined time period; and
generating an enabling signal in synchronization with the (n+1)-th R wave when and after the first time interval exceeds the first predetermined time period,
determining whether or not a second time interval as a time interval from the n-th R wave to an (n+2)-th R wave exceeds a second predetermined time period if the first time interval is equal to or less than the first predetermined time period, and generating an enabling signal in synchronization with the (n+2)-th R wave when and after the second time interval exceeds the second predetermined time period; wherein
the n-th R wave, the (n+1)-th R wave, and the (n+2)-th R wave are detected in a mentioned order, and n is an integer equal to or more than one.

The defibrillation signal generation method allows a T wave included in a detected R wave to be reliably excluded from a voltage application target. Furthermore, the defibrillation signal generation method facilitates selection of an appropriate R wave as a voltage application target, from R waves having a narrow interval therebetween, and enables voltage application for defibrillation.

Advantageous Effects of the Invention

The defibrillating electrical apparatus and the defibrillation signal generation method allow a T wave included in a detected R wave to be reliably excluded from a voltage application target. Furthermore, the defibrillating electrical apparatus and the defibrillation signal generation method facilitate selection of an appropriate R wave as a voltage application target, from R waves having a narrow interval therebetween, and enable voltage application for defibrillation.

DESCRIPTION OF EMBODIMENTS

The present invention will be specifically explained below based on the following embodiments, however, the present invention is not restricted by the embodiments described below of course, and can be certainly put into practice after appropriate modifications within in a range meeting the gist of the above and the below, all of which are included in the technical scope of the present invention. In the drawings, hatching, a reference sign for a member may be omitted for convenience, and in such a case, the description and other drawings should be referred to. In addition, sizes of various members in the drawings may differ from the actual sizes thereof, since priority is given to understanding the features of the present invention.

A defibrillating electrical apparatus according to an embodiment of the present invention includes an electrocardiographic waveform input unit, and an enabling signal generator configured to generate an enabling signal for enabling voltage application for defibrillation, and satisfies a necessary condition 1 or a necessary condition 2 described below. An n-th R wave, an (n+1)-th R wave, and an (n+2)-th R wave to be described below are detected in the mentioned order, and n is an integer equal to or more than one.

(Necessary Condition 1)

The defibrillating electrical apparatus is controlled such that the enabling signal generator generates an enabling signal for the (n+1)-th R wave when and after a first time interval as a time interval from the n-th R wave to the (n+1)-th R wave of an electrocardiographic waveform exceeds a first predetermined time period.

(Necessary Condition 2)

If the first time interval is equal to or less than the first predetermined time period, the defibrillating electrical apparatus is controlled such that the enabling signal generator generates an enabling signal for the (n+2)-th R wave when and after a second time interval as a time interval from the n-th R wave to the (n+2)-th R wave of the electrocardiographic waveform exceeds a second predetermined time period.

An electrocardiographic waveform includes an R wave and a T wave appearing after the R wave, and the R wave and the T wave have an interval therebetween, which is typically shorter than an interval between an R wave and a subsequent R wave. The defibrillating electrical apparatus thus allows the T wave included in the R wave detected under the necessary condition 1 to be reliably excluded from a voltage application target. Furthermore, the defibrillating electrical apparatus facilitates selection of an appropriate R wave as a voltage application target, from R waves having a narrow interval therebetween under the necessary condition 2, and enables voltage application for defibrillation.

Figure 1:
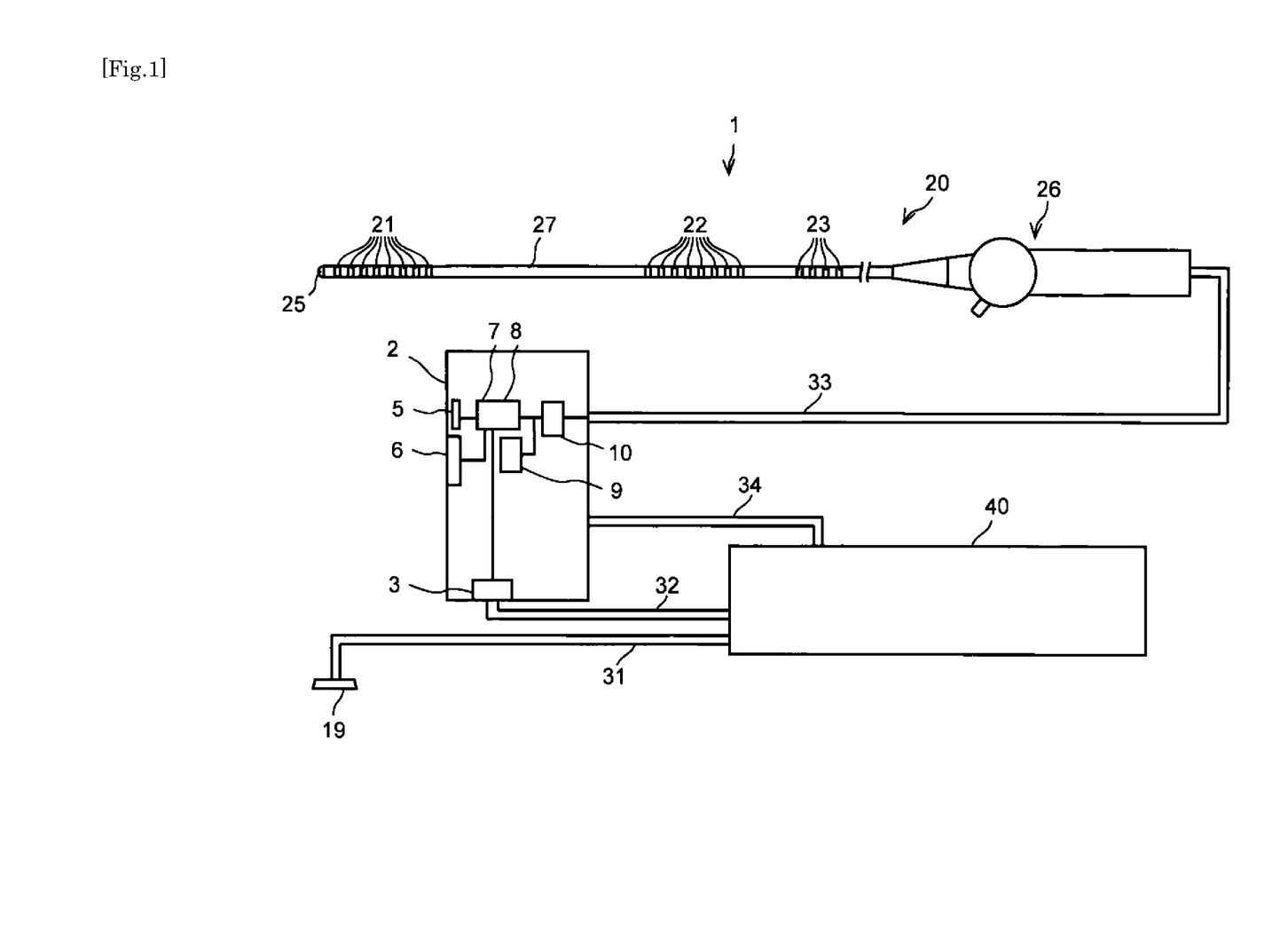
FIG. 1 is a schematic diagram depicting a configuration of a defibrillation catheter system including the defibrillating electrical apparatus according to the first embodiment of the present invention.
Figure 2:
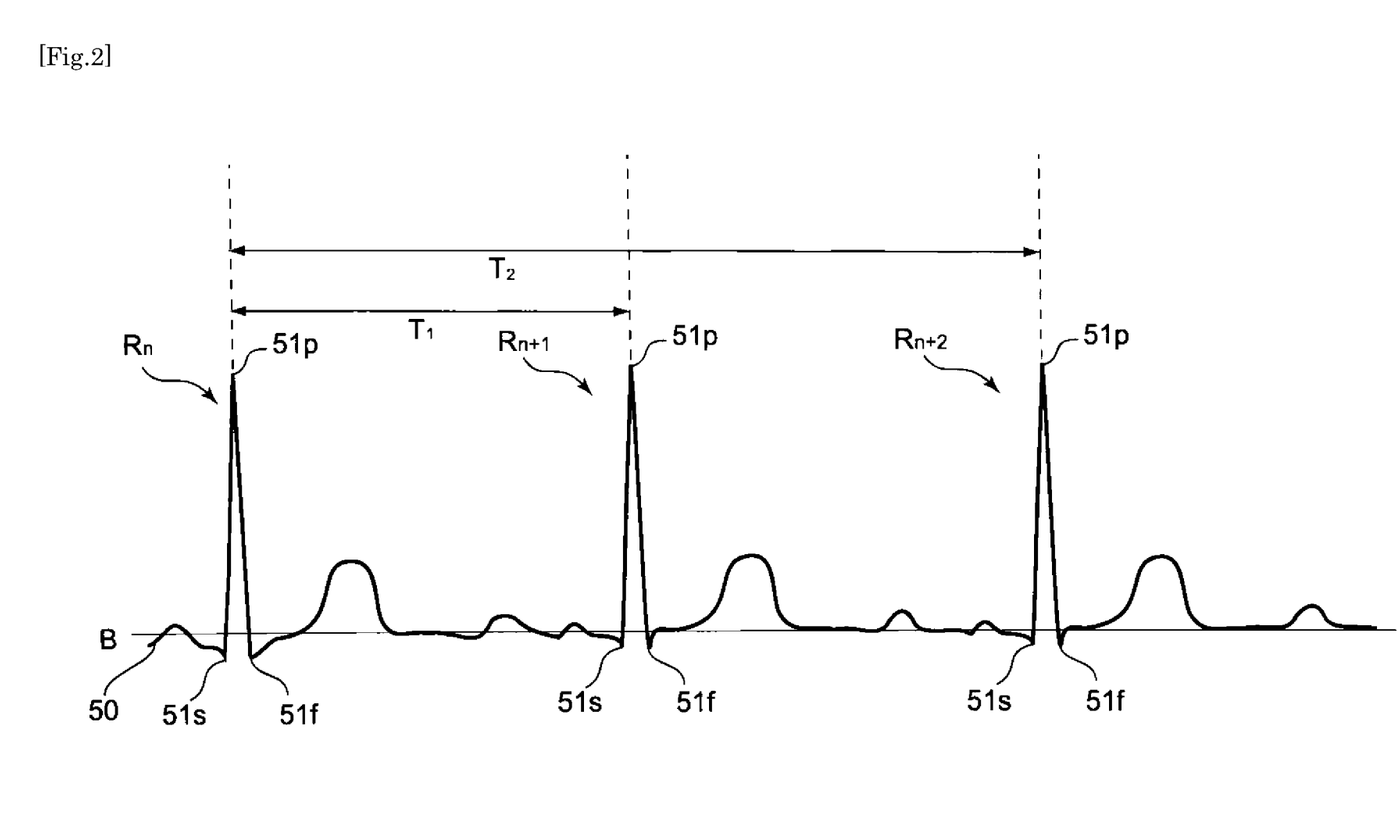
FIG. 2 is a graph indicating an exemplary electrocardiographic waveform.
Figure 3:
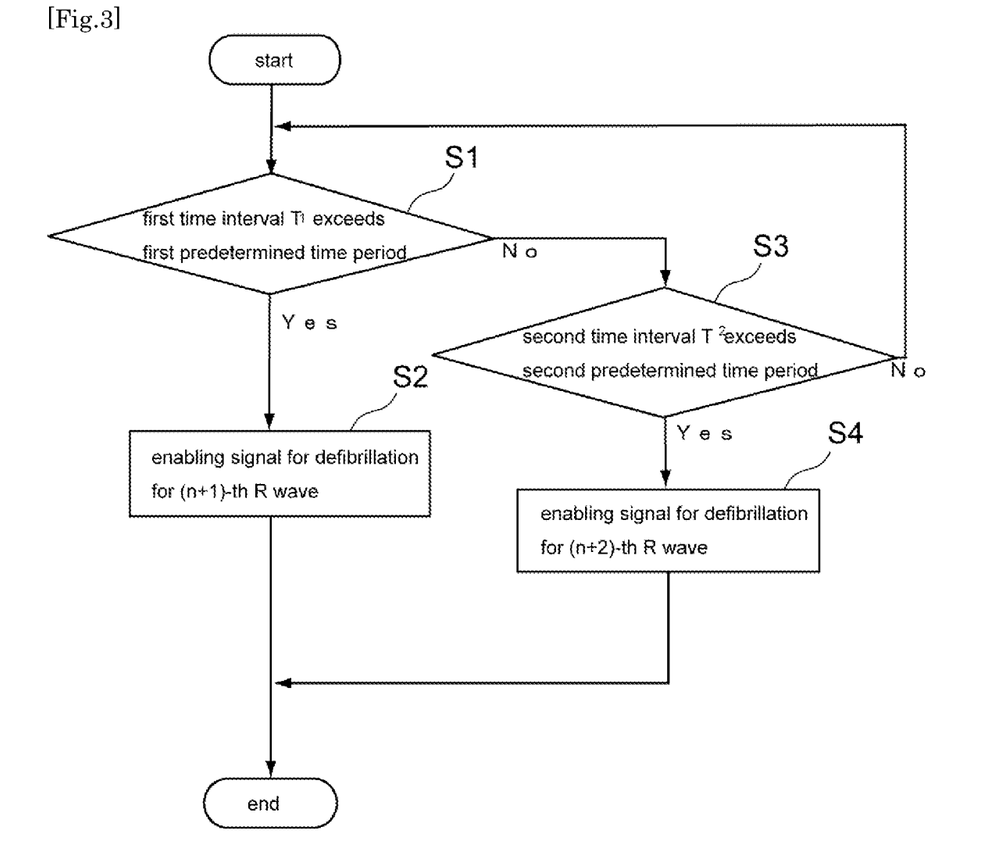
FIG. 3 is a flowchart depicting a defibrillation signal generation method according to the embodiment of the present invention.

With reference to FIGS. 1 to 3, description is made hereinafter to a configuration of a defibrillating electrical apparatus according to a first embodiment of the present invention. FIG. 1 is a schematic diagram depicting a configuration of a defibrillation catheter system including the defibrillating electrical apparatus according to the first embodiment of the present invention. FIG. 2 is a graph indicating an exemplary electrocardiographic waveform. FIG. 3 is a flowchart depicting a defibrillation signal generation method according to the embodiment of the present invention. FIG. 2 includes solid line B extending along a time axis and indicating a baseline of the electrocardiographic waveform.

FIG. 1 depicts a defibrillating electrical apparatus 2 including an electrocardiographic waveform input unit 3 and an enabling signal generator 7. The defibrillating electrical apparatus 2 is exemplarily configured to receive, from the electrocardiographic waveform input unit 3 via an electrocardiograph 40 or the like, an electrocardiographic waveform obtained by a body surface electrode 19 disposed on a human body surface. The defibrillating electrical apparatus 2 further satisfies the necessary condition 1 or 2. Specifically, as depicted in FIGS. 2 and 3, the defibrillating electrical apparatus calculates a first time interval $T_1$ as a time interval from an n-th R wave $R_n$ to an (n+1)-th R wave $R_{n+1}$ of an electrocardiographic waveform 50, and determines whether or not the first time interval $T_1$ exceeds a first predetermined time period (step S1). If the first time interval $T_1$ exceeds the first predetermined time period, the defibrillating electrical apparatus is controlled such that the enabling signal generator 7 generates an enabling signal for defibrillation for the (n+1)-th R wave $R_{n+1}$ when and after the first time interval $T_1$ exceeds the first predetermined time period (step S2). If the first time interval $T_1$ is equal to or less than the first predetermined time period, the defibrillating electrical apparatus calculates a second time interval $T_2$ as a time interval from the n-th R wave $R_n$ to an (n+2)-th R wave $R_{n+2}$ of the electrocardiographic waveform 50, and determines whether or not the second time interval $T_2$ exceeds a second predetermined time period (step S3). If the second time interval $T_2$ exceeds the second predetermined time period, the defibrillating electrical apparatus is controlled such that the enabling signal generator 7 generates an enabling signal for defibrillation for the (n+2)-th R wave $R_{n+2}$ when and after the second time interval $T_2$ exceeds the second predetermined time period (step S4).

As in FIG. 2, the n-th R wave, the (n+1)-th R wave, and the (n+2)-th R wave are detected in the mentioned order, and n is an integer equal to or more than one. The necessary conditions 1 and 2 do not particularly limit an R wave detection method, and an R wave can be detected in accordance with a publicly known method.

The first time interval $T_1$ corresponds to a time interval (unit: second) from the n-th R wave $R_n$ to the (n+1)-th R wave $R_{n+1}$ of the electrocardiographic waveform 50. Although there is no particular limitation on a method of setting the first time interval $T_1$, as in FIG. 2, the first time interval $T_1$ preferably corresponds to a time interval from a peak 51p of the n-th R wave $R_n$ to a peak 51p of the (n+1)-th R wave $R_{n+1}$ of the electrocardiographic waveform 50. A peak position of the electrocardiographic waveform 50 can be easily specified, so that the first time interval $T_1$ can be quickly calculated in accordance with such a method. This enables prompt detection of an R wave as a voltage application target, and achieves prompt voltage application to a patient.

The first time interval $T_1$ can be also calculated with reference to an interval between specific time points other than peaks of adjacent R waves. For example, the first time interval $T_1$ may be calculated with comparison between time points before the peaks of the adjacent R waves. Though not depicted, the first time interval $T_1$ is also preferred to correspond to a time interval from a time point when waveform height of the n-th R wave $R_n$ of the electrocardiographic waveform 50 exceeds a first predetermined value to a time point when waveform height of the (n+1)-th R wave $R_{n+1}$ exceeds the first predetermined value. Assume that the first predetermined value is located in terms of waveform height between a beginning 51s of an R wave and the peak 51p of the R wave. Assuming that an electrocardiographic waveform includes a baseline at height of 0% and a maximum peak at height of 100%, the first predetermined value may be set to a value of 10% or more, 50% or more, 90% or more, or the like. The first predetermined value thus set enables calculation of the first time interval $T_1$ at an early stage. The first time interval $T_1$ may alternatively correspond to a time interval from the beginning 51s of the n-th R wave $R_n$ to the beginning 51s of the (n+1)-th R wave $R_{n+1}$ of the electrocardiographic waveform 50. The time point when the waveform height of the n-th R wave $R_n$ exceeds a predetermined value indicates a time point when the waveform height initially exceeds the predetermined value. The same applies to the following description.

According to a different embodiment, the first time interval $T_1$ may correspond to a time interval from a time point when the waveform height of the n-th R wave $R_n$ of the electrocardiographic waveform 50 falls below a second predetermined value to a time point when the waveform height of the (n+1)-th R wave $R_{n+1}$ falls below the second predetermined value. Assume that the second predetermined value is located in terms of waveform height between the peak 51p and an end 51f of an R wave. Assuming that an electrocardiographic waveform includes a baseline at height of 0% and a maximum peak at height of 100%, the second predetermined value may be set to a value of 95% or less, 50% or less, 20% or less, or the like. The second predetermined value thus set also enables calculation of the first time interval $T_1$. The first time interval $T_1$ may alternatively correspond to a time interval from the end 51f of the n-th R wave $R_n$ to the end 51f of the (n+1)-th R wave $R_{n+1}$ of the electrocardiographic waveform 50. The time point when the waveform height of the n-th R wave $R_n$ falls below a predetermined value indicates a time point when the waveform height initially falls below the predetermined value. The same applies to the following description.

The second time interval $T_2$ corresponds to a time interval (unit: second) from the n-th R wave $R_n$ to the (n+2)-th R wave $R_{n+2}$ of the electrocardiographic waveform 50. Although there is no particular limitation on a method of setting the second time interval $T_2$, as in FIG. 2, if the first time interval $T_1$ corresponds to the time interval from the peak 51p of the n-th R wave $R_n$ to the peak 51p of the (n+1)-th R wave $R_{n+1}$ of the electrocardiographic waveform 50, the second time interval $T_2$ preferably corresponds to a time interval from the peak 51p of the n-th R wave $R_n$ to the peak 51p of the (n+2)-th R wave $R_n+_2$ of the electrocardiographic waveform 50. A peak position of the electrocardiographic waveform 50 can be easily specified, so that the second time interval $T_2$ can be quickly calculated in accordance with the above method, similarly to the first time interval $T_1$.

Similarly to the first time interval $T_1$, the second time interval $T_2$ can alternatively correspond to an interval between specific time points other than peaks. Though not depicted, if the first time interval $T_1$ corresponds to the time interval from the time point when the waveform height of the n-th R wave $R_n$ of the electrocardiographic waveform 50 exceeds the first predetermined value to the time point when the waveform height of the (n+1)-th R wave $R_{n+1}$ exceeds the first predetermined value, the second time interval $T_2$ is also preferred to correspond to a time interval from the time point when the waveform height of the n-th R wave $R_n$ of the electrocardiographic waveform 50 exceeds the first predetermined value to a time point when waveform height of the (n+2)-th R wave $R_{n+2}$ exceeds the first predetermined value. The first predetermined value thus set enables calculation of the second time interval $T_2$ at an early stage.

According to a different embodiment, if the first time interval $T_1$ corresponds to the time interval from the time point when the waveform height of the n-th R wave $R_n$ of the electrocardiographic waveform 50 falls below the second predetermined value to the time point when the waveform height of the (n+1)-th R wave $R_n+1$ falls below the second predetermined value, the second time interval $T_2$ may correspond to a time interval from the time point when the waveform height of the n-th R wave $R_n$ of the electrocardiographic waveform 50 falls below the second predetermined value to a time point when the waveform height of the (n+2)-th R wave $R_{n+2}$ falls below the second predetermined value. The second predetermined value thus set also enables calculation of the second time interval $T_2$.

If the first time interval $T_1$ corresponds to the time interval from the beginning 51s of the n-th R wave $R_n$ to the beginning 51s of the (n+1)-th R wave $R_{n+1}$ of the electrocardiographic waveform 50, the second time interval $T_2$ may correspond to a time interval from the beginning 51s of the n-th R wave $R_n$ to the beginning 51s of the (n+2)-th R wave $R_{n+2}$ of the electrocardiographic waveform 50. If the first time interval $T_1$ corresponds to the time interval from the end 51f of the n-th R wave $R_n$ to the end 51f of the (n+1)-th R wave $R_{n+1}$ of the electrocardiographic waveform 50, the second time interval $T_2$ may correspond to a time interval from the end 51f of the n-th R wave $R_n$ to the end 51f of the (n+2)-th R wave $R_{n+2}$ of the electrocardiographic waveform 50.

The first time interval $T_1$ and the second time interval $T_2$ can be calculated with use of a processing controller 8 to be described later.

The first predetermined time period can be set in accordance with a patient, for example, is preferably 100 milliseconds or more, is more preferably 150 milliseconds or more, and is further preferably 200 milliseconds or more. The first predetermined time period is preferably 300 milliseconds or less, is more preferably 290 milliseconds or less, and is further preferably 280 milliseconds or less.

Similarly to the first predetermined time period, the second predetermined time period can be set in accordance with a patient, for example, is preferably 100 milliseconds or more, is more preferably 150 milliseconds or more, and is further preferably 200 milliseconds or more. The second predetermined time period is preferably 300 milliseconds or less, is more preferably 290 milliseconds or less, and is further preferably 280 milliseconds or less.

Each of the first predetermined time period and the second predetermined time period is preferably 100 milliseconds or more, is more preferably 150 milliseconds or more, and is further preferably 200 milliseconds or more. Each of the first predetermined time period and the second predetermined time period is preferably 300 milliseconds or less, is more preferably 290 milliseconds or less, and is further preferably 280 milliseconds or less. The first predetermined time period and the second predetermined time period thus set facilitate selection of an R wave as a voltage application target from detected R waves.

At least one of the first predetermined time period and the second predetermined time period may be set in accordance with an average value of time intervals of adjacent R waves detected during a fifth predetermined time period before the n-th R wave. The fifth predetermined time period (unit: millisecond) can be set as a time period including an electrocardiographic waveform exemplarily having three or more cycles and ten or less cycles. The first predetermined time period and the second predetermined time period can thus be set in accordance with characteristics of an electrocardiographic waveform of a patient. This is particularly effective to a patient having R waves with a narrow interval.

The first predetermined time period and the second predetermined time period are preferably equal to each other. Even with R waves having a narrow interval, an R wave as a voltage application target can thus be easily selected from detected R waves. The first predetermined time period and the second predetermined time period may alternatively be different from each other.

The first predetermined time period and the second predetermined time period are preferably stored in a memory to be described later. They are not necessarily stored in an identical memory, but may alternatively be stored in different memories. The defibrillating electrical apparatus 2 according to the first embodiment includes a memory 5 storing the first predetermined time period and the second predetermined time period.

The enabling signal generator 7 has only to generate an enabling signal under the necessary condition 1 when and after the first time interval $T_1$ exceeds the first predetermined time period. For example, an enabling signal is preferably generated within 60 milliseconds after the first time interval $T_1$ exceeds the first predetermined time period, is more preferably generated within 50 milliseconds, and is further preferably generated within 10 milliseconds. An enabling signal is also preferably generated when the first time interval $T_1$ exceeds the first predetermined time period.

The enabling signal generator 7 has only to generate an enabling signal under the necessary condition 2 when and after the second time interval $T_2$ exceeds the second predetermined time period. For example, an enabling signal is preferably generated within 60 milliseconds after the second time interval $T_2$ exceeds the second predetermined time period, is more preferably generated within 50 milliseconds, and is further preferably generated within 10 milliseconds. An enabling signal is also preferably generated when the second time interval $T_2$ exceeds the second predetermined time period.

If the second time interval $T_2$ is equal to or less than the second predetermined time period, the enabling signal generator 7 is preferably controlled not to generate any enabling signal. If the second time interval $T_2$ is equal to or less than the second predetermined time period, it may be determined whether or not the first time interval $T_1$ exceeds the first predetermined time period with the (n+2)-th R wave $R_{n+2}$ re-recognized as the n-th R wave $R_n$. If the second time interval $T_2$ is equal to or less than the second predetermined time period, it may alternatively be determined whether or not the first time interval $T_1$ exceeds the first predetermined time period with the R wave detected subsequently to the (n+2)-th R wave $R_{n+2}$ re-recognized as the n-th R wave $R_n$, as depicted in FIG. 3. Whether or not a detected R wave satisfies the predetermined time period described in the necessary condition 1 or 2 is determined repeatedly, to enable selection of an R wave as a voltage application target and appropriate voltage application.

There is no particular limitation on an enabling signal as long as the enabling signal relates to voltage application for defibrillation. Examples of the enabling signal include an enabling signal for charge a power source unit 9 to be described later, an enabling signal for pulse voltage generation, an enabling signal for voltage application, and an enabling signal for switching on a switching unit 10 to be described later. Under the necessary condition 1 or 2, the enabling signal generator 7 has only to generate at least one of these enabling signals. Some of these enabling signals may be generated through operation of an operation unit 6 to be described later. The enabling signal generator 7 may be provided not limitedly at the processing controller 8 to be described later, but may alternatively be provided at the power source unit 9 or the like.

The electrocardiographic waveform 50 as indicated in FIG. 2 is displayed at a display unit of the electrocardiograph 40 or the like. The electrocardiographic waveform 50 is preferably obtained through II induction that facilitates R wave detection. The electrocardiographic waveform 50 may alternatively be obtained through, not limitedly to II induction, other induction in accordance with a patient heart direction. In an exemplary case where the electrocardiographic waveform 50 is obtained through twelve types of induction, the electrocardiographic waveform 50 may be obtained through V1 induction, V2 induction, V3 induction, V4 induction, V5 induction, V6 induction, I induction, II induction, III induction, aVR induction, aVL induction, or aVF induction. The electrocardiographic waveform 50 may be an average of waveforms obtained through two or more types of induction, three or more types of induction, or twelve types of induction.

Preferably, the defibrillating electrical apparatus 2 further includes the power source unit 9 configured to generate applied voltage, and is controlled such that the enabling signal generator 7 generates an enabling signal when and after a necessary condition 3 described below is further satisfied under the necessary condition 1 or 2.

(Necessary Condition 3)

The power source unit 9 terminates charging with voltage necessary for voltage application.

The power source unit 9 is configured to generate applied voltage for defibrillation, and preferably includes a capacitor configured to charge with the applied voltage as to be described later. For example, the operation unit 6 to be described later can be operated to control start of charge of the capacitor. An enabling signal is generated after the defibrillating electrical apparatus 2 terminates charge with voltage necessary for voltage application at the power source unit 9, to inhibit defibrillation in an insufficiently charged state.

The power source unit 9 preferably includes at least one of a power source, a booster circuit configured to boost direct voltage, a charging circuit, and a waveform generation circuit configured to generate pulse voltage. At least some of these elements may be provided outside the power source unit 9. There is no particular limitation on a position of the power source unit 9, which may be disposed outside the processing controller 8 as depicted in FIG. 1, or may be disposed in the processing controller 8. The power source unit 9 disposed outside the processing controller 8 is preferably connected to the processing controller 8.

Whether or not the necessary condition 3 is satisfied may be determined and whether or not the first time interval $T_1$ exceeds the first predetermined time period may be subsequently determined. Alternatively, whether or not the first time interval $T_1$ exceeds the first predetermined time period may be determined and whether or not the necessary condition 3 is satisfied may be subsequently determined. Still alternatively, whether or not the necessary condition 3 is satisfied may be determined after determination of whether or not the first time interval $T_1$ exceeds the first predetermined time period or after determination of whether or not the second time interval $T_2$ exceeds the second predetermined time period.

The defibrillating electrical apparatus 2 is preferably provided with the operation unit 6 configured to be operated for charge of the capacitor. The operation unit 6 can be exemplified by a publicly known input unit such as a button switch or a lever. Some of the above enabling signals may be generated through operation of the operation unit 6.

The operation unit 6 is preferably connected to the power source unit 9. This enables transmission of an input signal from the operation unit 6 to the power source unit 9. According to a different aspect, the operation unit 6 may be connected to the processing controller 8 to be described later. This enables transmission of an input signal from the operation unit 6 to the power source unit 9 via the processing controller 8.

The defibrillating electrical apparatus 2 is preferably controlled such that the enabling signal generator 7 generates an enabling signal when and after a necessary condition 4 described below is further satisfied under the necessary condition 1 or 2.

(Necessary Condition 4)

Voltage for defibrillation is not applied to an R wave immediately before the R wave as a target of an enabling signal for defibrillation.

This inhibits continuous voltage application for defibrillation to continuous R waves selected as voltage application targets, for higher safety.

The defibrillating electrical apparatus 2 may include the memory 5 configured to store whether or not voltage for defibrillation is applied to an R wave. The memory 5 can be publicly known, examples of which include a volatile memory such as a random access memory, and a nonvolatile memory such as a flash memory. The memory 5 is preferably connected to the enabling signal generator 7. This enables transmission, from the enabling signal generator 7 to the memory 5, a signal indicating whether or not voltage for defibrillation is applied to which R wave. FIG. 1 depicts the memory 5 disposed outside the processing controller 8 and connected to the processing controller 8. Though not depicted, the memory 5 may alternatively be disposed in the processing controller 8.

Whether or not the necessary condition 4 is satisfied may be determined and whether or not the first time interval $T_1$ exceeds the first predetermined time period may be subsequently determined. Alternatively, whether or not the first time interval $T_1$ exceeds the first predetermined time period may be determined and whether or not the necessary condition 4 is satisfied may be subsequently determined. Still alternatively, whether or not the necessary condition 4 is satisfied may be determined after determination of whether or not the first time interval $T_1$ exceeds the first predetermined time period or after determination of whether or not the second time interval $T_2$ exceeds the second predetermined time period.

The defibrillating electrical apparatus 2 may be controlled not to apply voltage to an R wave detected subsequently to the R wave receiving voltage under the necessary condition 1 or 2. This inhibits voltage application to continuous R waves, for higher safety of the apparatus.

This defibrillating electrical apparatus may alternatively be configured to allow an operator to check which waveform in the electrocardiographic waveform 50 corresponds to an R wave as a possible voltage application target. For example, the defibrillating electrical apparatus is preferably controlled to generate a sign status signal for sign impartment to the (n+1)-th R wave $R_n+1$ when and after the first time interval $T_1$ exceeds the first predetermined time period, and to generate a sign status signal for sign impartment to the (n+2)-th R wave $R_{n+2}$ when and after the second time interval $T_2$ exceeds the second predetermined time period.

The defibrillating electrical apparatus is preferably controlled to generate a sign status signal after the first time interval $T_1$ exceeds the first predetermined time period and before generation of an enabling signal for defibrillation. The defibrillating electrical apparatus is preferably controlled to generate a sign status signal after the second time interval $T_2$ exceeds the second predetermined time period and before generation of an enabling signal for defibrillation.

The sign imparted to an R wave may be displayed at the display unit configured to display an electrocardiographic waveform. As to the display unit and the sign, reference can be made to description of a display unit 73 according to a second embodiment to be described later.

This enables switching from a defibrillation disabled mode to an enabled mode after finding a heart condition through visual check of an R-R interval or the like with reference to signs imparted to R waves or the like. This facilitates execution of defibrillation for higher safety.

The defibrillating electrical apparatus 2 is preferably an intracardiac defibrillating electrical apparatus. The intracardiac defibrillating electrical apparatus is configured to refer to a voltage waveform lower in terms of energy than an external defibrillator, so as to reduce a load to a patient and to be applicable during a catheter test on arrythmia or during a cautery operation.

Figure 4:
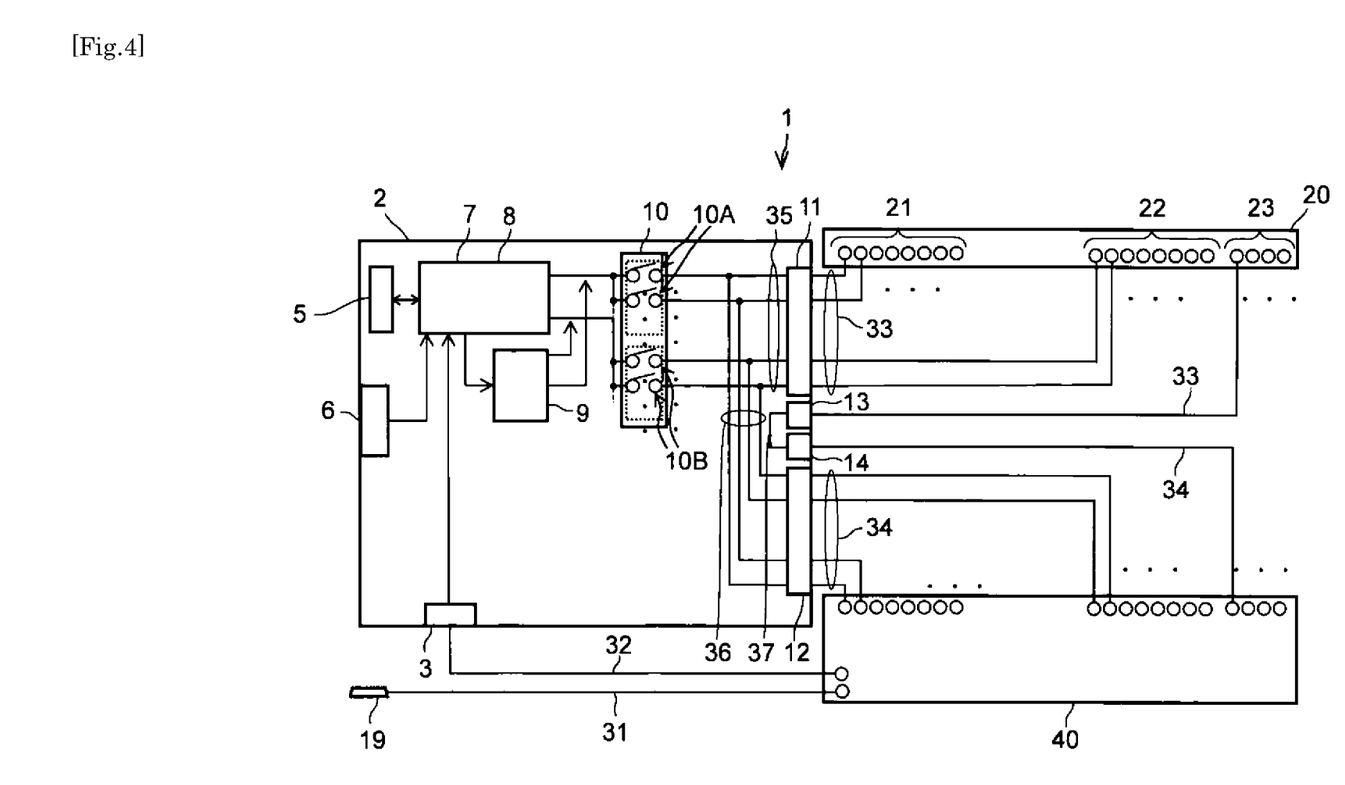
FIG. 4 is a block diagram of the defibrillation catheter system including the defibrillating electrical apparatus according to the embodiment of the present invention.

The defibrillating electrical apparatus 2 has been described mainly in terms of the configuration for enabling signal generation. With reference to FIGS. 1 and 4, description is made below to the defibrillating electrical apparatus 2 according to the first embodiment and a configuration of a defibrillation catheter system 1 including the defibrillating electrical apparatus. FIG. 4 is a block diagram of the defibrillation catheter system 1 including the defibrillating electrical apparatus 2 according to the embodiment of the present invention.

As depicted in FIG. 4, the present invention provides the intracardiac defibrillation catheter system 1 including a catheter 20 configured to be inserted to a cardiac cavity, the catheter 20 having a distal end, a proximal end, and a plurality of electrodes provided at a distal portion of the catheter; and the defibrillating electrical apparatus 2 configured to apply voltage to the plurality of electrodes.

The catheter has a proximal side indicating a side close to hands of an operator (operating person) in an extending direction of the catheter, and a distal side indicating a side opposite the proximal side (i.e. a side close to a treatment target). The catheter has a proximal portion indicating a half close to the hands of the operator (operating person) in the extending direction of the catheter, and the distal portion indicating a half other than the proximal portion (i.e. a half close to the treatment target of the catheter).

The defibrillation catheter system 1 depicted in FIGS. 1 and 4 is configured to transmit electrocardiac information obtained by the body surface electrode 19 disposed on a human body surface to the electrocardiograph 40 via a first conducting wire 31. The electrode configured to obtain electrocardiac information is not limited to the body surface electrode but can be an electrode configured to measure endocardial potential. The body surface electrode is preferred due to its excellent R wave detection sensitivity. The body surface electrode is preferably an electrode for twelve types of induction.

The defibrillating electrical apparatus 2 depicted in FIGS. 1 and 4 includes a first connection 11 connected to the plurality of electrodes disposed at the distal portion of the catheter 20, a second connection 12 connected to the electrocardiograph 40, the power source unit 9 configured to generate applied voltage, and the switching unit 10 connected to the power source unit 9 and configured to switch to an application mode for voltage application. The first connection 11 is connected to the power source unit 9 via the switching unit 10, and is connected to the second connection 12 not via the switching unit 10. The first connection 11 is connected to the second connection 12 not via the switching unit 10, to allow the respective electrodes to measure local potential even during defibrillation.

The defibrillating electrical apparatus 2 includes the electrocardiographic waveform input unit 3, so that the electrocardiographic waveform input unit 3 internally inputs information on an electrocardiographic waveform outputted from the electrocardiograph 40 via a second conducting wire 32 or the like.

The electrocardiographic waveform received from the electrocardiographic waveform input unit 3 may be transmitted to the processing controller 8. The processing controller 8 is configured to determine, as to the electrocardiographic waveform 50 thus transmitted, whether or not the first time interval $T_1$ exceeds the first predetermined time period, and whether or not the second time interval $T_2$ exceeds the second predetermined time period. The processing controller 8 is provided therein with the enabling signal generator 7. The enabling signal generator 7 is configured to generate an enabling signal for voltage application for the (n+1)-th R wave $R_n+1$ when and after the first time interval $T_1$ exceeds the first predetermined time period. If the first time interval $T_1$ is equal to or less than the first predetermined time period, the enabling signal generator 7 is configured to generate an enabling signal for voltage application for the (n+2)-th R wave $R_n+_2$ when and after the second time interval $T_2$ exceeds the second predetermined time period. The enabling signal is transmitted to the power source unit 9, to allow application of direct voltage having positive and negative polarities respectively to a first electrode group 21 and a second electrode group 22. An electrification waveform may be biphasic with a halfway inverted polarity, or may be monophasic with a constant polarity. A biphasic waveform is preferred due to stimulation with less energy. Electrification energy provided to a living body can be exemplarily set to 1 J or more and 30 J or less.

Though not depicted, the defibrillating electrical apparatus 2 may include a display unit configured to display an electrocardiographic waveform, and the display unit may be configured to display a sign for an R wave. As to the display unit and the sign, reference can be made to description of the display unit 73 according to the second embodiment.

Under at least one of the necessary condition 1 and the necessary condition 2, the enabling signal generator 7 may be controlled to generate an enabling signal for switching on. The enabling signal is transmitted to a first switch 10A and a second switch 10B of the switching unit 10, and the enabling signal can cause the first switch 10A and the second switch 10B to be switched from an OFF state to an ON state, to electrify the first electrode group 21 and the second electrode group 22. In the OFF state of the switches constituting the switching unit 10 as depicted in FIG. 4, the first electrode group 21 and the second electrode group 22 are insulated from the power source unit 9, to enable measurement of endocardial potential with use of the first electrode group 21 and the second electrode group 22 without execution of defibrillation.

At least one of functions of the defibrillating electrical apparatus 2, such as functions of the electrocardiographic waveform input unit 3, the memory 5, the enabling signal generator 7, the processing controller 8, the power source unit 9, and the switching unit 10, may be implemented by hardware or software. Examples of the hardware include a logic circuit provided in an integrated circuit, such as large scale integration (LSI), an application specific integrated circuit (ASIC), or a field-programmable gate array (FPGA).

The defibrillating electrical apparatus 2 may include a computer configured to execute a command of a program as software for implementation of at least one of the functions of the electrocardiographic waveform input unit 3, the memory 5, the enabling signal generator 7, the processing controller 8, the power source unit 9, and the switching unit 10. The computer preferably includes a processor, and a computer-readable storage medium storing the program. The function can be implemented when the processor executes the program stored in the computer-readable storage medium. Examples of the processor include a central processing unit (CPU). Examples of the storage medium include a read only memory (ROM). The storage medium can also include a random access memory (RAM). The program may be supplied to the computer via an appropriate transmission medium configured to transmit the program. Examples of the transmission medium include a communication network and a communication line.

The switching unit 10 may include one, or two or more switches. As depicted in FIG. 4, the switching unit 10 preferably includes a plurality of first switches 10A connected in parallel, and a plurality of second switches 10B connected in parallel. In a case where the catheter 20 includes the first electrode group 21 and the second electrode group 22, preferably, the first electrode group 21 is connected to the power source unit 9 respectively via the first switches 10A, and the second electrode group 22 is connected to the power source unit 9 respectively via the second switches 10B. The first electrode group 21 and the second electrode group 22 are preferably connected to the power source unit 9 via the different switches. This configuration electrically separates the electrode groups, to enable each of the electrode groups to independently obtain endocardial potential.

As depicted in FIG. 1, the defibrillating electrical apparatus 2 may include a third electrode group 23 including dedicated electrodes for measurement of endocardial potential and disposed proximally to the first electrode group 21 and the second electrode group 22. The third electrode group 23 is positioned proximally, and can thus be positioned correspondingly to a superior aorta or the like. The third electrode group 23 is preferred not to be connected to the power source unit 9. This configuration allows the third electrode group 23 to be easily used as dedicated electrodes for measurement of endocardial potential.

There is no particular limitation on the number of electrodes constituting each of the electrode groups, and the electrode groups may each include an identical or different number of electrodes. The number of electrodes constituting the first electrode group 21 is preferably identical to the number of electrodes constituting the second electrode group 22. The first electrode group 21 and the second electrode group 22 can thus be made easily identical in terms of surface areas. The first electrode group 21 and the second electrode group 22 having identical surface areas and including identical numbers of electrodes evenly disposed achieve efficient defibrillation and improved measurement accuracy of an endocardial electrocardiogram.

The number of electrodes constituting the third electrode group 23 is preferably equal to or less than the number of electrodes constituting the first electrode group 21 and the number of electrodes constituting the second electrode group 22. For example, the first electrode group 21 and the second electrode group 22 can each include eight electrodes, and the third electrode group 23 can include four electrodes. The number of electrodes constituting the third electrode group 23 thus set achieves appropriate potential measurement at a position corresponding to a superior aorta.

Examples of the catheter 20 include a resin tube 27. The first electrode group 21 and the second electrode group 22 can be disposed at a distal portion of the resin tube 27. Each of the electrode groups is preferably disposed in a region occupying a half or more of an outer circumference of the resin tube 27, and more preferably forms a ring shape. The electrodes thus disposed have a larger contact area with a heart, to facilitate endocardial potential measurement and electrostimulation.

The electrode groups have only to contain a conductive material such as platinum or stainless steel, and preferably contain a radiopaque material such as platinum for easier finding of the positions of the electrodes during X-ray fluoroscopy.

As depicted in FIG. 1, the catheter 20 has a distal end portion that may be provided with a tip portion 25. The tip portion 25 preferably has a tapered portion distally reduced in outer diameter. The tip portion 25 may contain a conductive material. The tip portion 25 can thus function as an electrode. The tip portion 25 may alternatively be made of a polymeric material. The tip portion 25 may be lower in terms of hardness than the resin tube 27 in order to protect a tissue from contact with the catheter 20.

The resin tube 27 has a lumen that may be provided with an operating wire or a spring member used to bend the distal side of the catheter 20. Specifically, the operating wire has a distal end portion preferably fixed to a distal end portion of the resin tube 27 or the tip portion 25, and a proximal end portion preferably fixed to a handle 26 to be described later.

As depicted in FIG. 4, each of the electrode groups is preferably connected with a third conducting wire 33 (lead wire). The third conducting wires 33 connected to the first electrode group 21 and the second electrode group 22 have second end portions preferably connected to the first connection 11 of the defibrillating electrical apparatus 2. The third conducting wires 33 connected to the third electrode group 23 have second end portions preferably connected to a third connection 13 of the defibrillating electrical apparatus 2. Each of the third conducting wires 33 may include a plurality of conducting wires coupled with use of a connecting member such as a connector.

The third connection 13 and a fourth connection 14 are preferably connected via a seventh conducting wire 37. The seventh conducting wire 37 may be a wiring material or may be part of a wiring pattern provided on a printed circuit board.

The first connection 11 and the switching unit 10 are preferably connected via a fifth conducting wire 35. This configuration achieves connection from the first electrode group 21 and the second electrode group 22 to the power source unit 9, to enable voltage application. The first electrode group 21, the second electrode group 22, and the power source unit 9 may be connected via different connecting members such as connectors.

The second connection 12 is preferably connected with a second end of a fourth conducting wire 34 connected to an input terminal of the electrocardiograph 40 corresponding to the first electrode group 21 and the second electrode group 22. The second connection 12 is preferably connected to the fifth conducting wire 35 by a sixth conducting wire 36. The fifth conducting wire 35 and the sixth conducting wire 36 are preferred not to be provided with any switch. This configuration enables measurement of endocardial potential via the first electrode group 21 and the second electrode group 22 even during defibrillation. Each of the fifth conducting wire 35 and the sixth conducting wire 36 may be a wiring material or may be part of a wiring pattern provided on a printed circuit board.

As depicted in FIG. 1, the resin tube 27 has a proximal side that may be provided with the handle 26 configured to be gripped by an operator in order to move the catheter 20. The handle 26 is not particularly limited in terms of its shape, but preferably has a truncated cone shape distally reduced in outer diameter, for relaxation of stress concentration to a portion connecting the resin tube 27 and the handle 26.

The electrocardiograph 40 measures endocardial potential by means of various types of electrodes. The electrocardiograph 40 can be publicly known.

Though not depicted, the defibrillating electrical apparatus 2 may include an electrode selecting switch for selection of an electrode for voltage application. This enables electrostimulation only to a specific electrode. There is no particular limitation on a position of the electrode selecting switch, but the electrode selecting switch is preferably connected to the power source unit 9, and is more preferably disposed in the processing controller 8. The electrode selecting switch may be provided separately from the switches (e.g. the first switches 10A and the second switches 10B) constituting the switching unit 10, or may correspond to at least one of the switches constituting the switching unit 10. Though not depicted, the defibrillating electrical apparatus 2 may be provided with a safety switch. This configuration achieves a fail-safe function of inhibiting unintended voltage application to a patient in an exemplary case where the switching unit 10 is in trouble. The safety switch is preferably connected between the switching unit 10 and the power source unit 9, and is more preferably connected between the processing controller 8 and the switching unit 10. Though not depicted, the defibrillating electrical apparatus 2 may be provided with a protection circuit configured to absorb high voltage generated during switch cut off. This configuration prevents damage to the switches. Though not depicted, the defibrillating electrical apparatus 2 may be provided with an overvoltage protection circuit disposed between the power source unit 9 and the electrocardiograph 40 and configured to protect the electrocardiograph 40 from overvoltage. This configuration prevents damage to the electrocardiograph 40 by overvoltage application. Though not depicted, the defibrillating electrical apparatus 2 may include an impedance measurement circuit. The impedance measurement circuit is preferably connected between the first electrode group 21 and the second electrode group 22 in order to measure impedance between the first electrode group 21 and the second electrode group 22.

Figure 5:
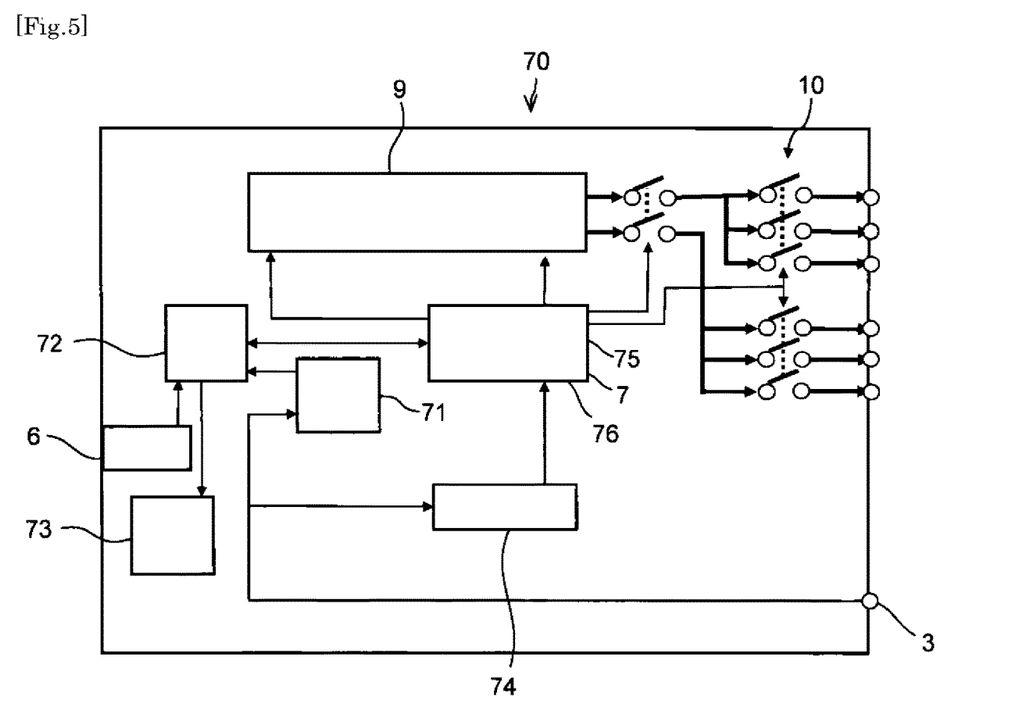
FIG. 5 is a block diagram of the defibrillating electrical apparatus according to the second embodiment.

With reference to FIG. 5, description is made next to a configuration of a defibrillating electrical apparatus 70 according to the second embodiment. FIG. 5 is a block diagram of the defibrillating electrical apparatus 70 according to the second embodiment. Any constituent similar to that of the defibrillating electrical apparatus 2 according to the first embodiment will be denoted by the same reference sign and will not be described repeatedly.

As depicted in FIG. 5, the defibrillating electrical apparatus 70 according to the second embodiment is preferably configured to display an electrocardiographic waveform at the display unit 73 in accordance with electrocardiac information received from the electrocardiographic waveform input unit 3 and transmitted via an A/D converter 71 and a first processing controller 72 (CPU). Preferably, the electrocardiac information received from the electrocardiographic waveform input unit 3 is transmitted to a comparator 74 configured to compare waveform height. When the electrocardiographic waveform exceeds a set predetermined value, the electrocardiac information is transmitted to a second processing controller 75 (FPGA) having the first predetermined time period, the second predetermined time period, and the like being set. When and after the first time interval $T_1$ exceeds the first predetermined time period, a signal is transmitted to the second processing controller 75 (FPGA). After the second processing controller 75 (FPGA) generates a sign status signal and the sign status signal is transmitted to the first processing controller 72 (CPU), the display unit 73 displays a sign for an R wave. Examples of a shape of the sign include a round shape, polygonal shapes such as a triangle shape and a quadrilateral shape, and a linear shape. The sign is displayed at a position such as a peak of an R wave. The sign status signal has only to cause the display unit 73 to display the sign for the R wave, and may be generated from the first processing controller 72 (CPU).

As described above, the defibrillating electrical apparatus 70 preferably includes the display unit 73 configured to display an electrocardiographic waveform. In this case, the defibrillating electrical apparatus is preferably controlled such that a sign status signal generator 76 generates a sign status signal for impartment of a sign to an R wave at the display unit 73 when and after the first time interval $T_1$ exceeds the first predetermined time period, or when and after the second time interval $T_2$ exceeds the second predetermined time period with the first time interval $T_1$ being equal to or less than the first predetermined time period. With a sign imparted to an R wave at the display unit 73 in this manner, an operator can visually check a state of the R wave as a voltage application target.

The defibrillating electrical apparatus 70 is preferably configured to switch from a disabled mode to an enabled mode in the second processing controller 75 (FPGA) through operation of the operation unit 6. Simultaneously to such mode switching, the defibrillating electrical apparatus 70 may be configured to set an applied energy amount, may be configured to start charge of the capacitor with applied energy, or may be configured to complete charge. The defibrillating electrical apparatus 70 may be further configured to automatically generate pulse voltage after charge completion. In the disabled mode, no enabling signal for defibrillation is generated even if a time interval between R waves satisfies the predetermined time period or the like described in the necessary condition 1 or 2. In the enabled mode, an enabling signal for defibrillation is generated if a time interval between R waves satisfies the predetermined time period or the like described in the necessary condition 1 or 2. An operator can thus switch to the disabled mode if defibrillation energy application is inappropriate, and to the enabled mode after defibrillation energy application is needed, for safer defibrillation. As to the enabling signal for defibrillation, reference can be made to description of the first embodiment.

The defibrillating electrical apparatus 70 is preferably configured such that a signal is transmitted to the second processing controller 75 (FPGA) having the first predetermined time period, the second predetermined time period, and the like being set when the electrocardiac information received from the electrocardiographic waveform input unit 3 is transmitted to the comparator 74 configured to compare waveform height and the electrocardiographic waveform exceeds the set predetermined value, and the second processing controller 75 (FPGA) generates an enabling signal when and after the first time interval $T_1$ exceeds the first predetermined time period, or when and after the second time interval $T_2$ exceeds the second predetermined time period with the first time interval $T_1$ being equal to or less than the first predetermined time period.

A portion from the electrocardiographic waveform input unit 3 to the enabling signal generator 7 is thus preferably constituted by a hardware circuit. The hardware circuit is not signal processed by software, for quicker signal processing. This shortens time from obtaining the electrocardiac information to generating an enabling signal. A signal from the electrocardiographic waveform input unit 3 to the enabling signal generator 7 may be an analog signal or a digital signal.

At least one of functions of the defibrillating electrical apparatus 70, such as functions of the electrocardiographic waveform input unit 3, the comparator 74, the enabling signal generator 7, the first processing controller 72, the second processing controller 75, the processing controller 8, the power source unit 9, the switching unit 10, and the like, may be implemented by hardware or software. As to details thereof, reference can be made to description of the first embodiment.

The present invention also includes a defibrillation signal generation method. As in FIG. 2 or the like, the defibrillation signal generation method according to an embodiment of the present invention includes: calculating the first time interval $T_1$ as the time interval from the n-th R wave $R_n$ to the (n+1)-th R wave $R_{n+1}$ of the electrocardiographic waveform and determining whether or not the first time interval $T_1$ exceeds the first predetermined time period; and generating an enabling signal in synchronization with the (n+1)-th R wave $R_n+1$ when and after the first time interval $T_1$ exceeds the first predetermined time period, calculating the second time interval $T_2$ as the time interval from the n-th R wave $R_n$ to the (n+2)-th R wave $R_{n+2}$, determining whether or not the second time interval exceeds the second predetermined time period if the first time interval $T_1$ is equal to or less than the first predetermined time period, and generating an enabling signal in synchronization with the (n+2)-th R wave $R_n+_2$ when and after the second time interval $T_2$ exceeds the second predetermined time period. The n-th R wave, the (n+1)-th R wave, and the (n+2)-th R wave are detected in the mentioned order, and n is an integer equal to or more than one.

The defibrillation signal generation method is preferred to further include determining whether or not the necessary condition 3 or the like is satisfied.
(Necessary Condition 3)

The power source unit 9 terminates charging with voltage necessary for voltage application.

The defibrillation signal generation method is preferred to further include determining whether or not the necessary condition 4 or the like is satisfied.
(Necessary Condition 4)

Voltage for defibrillation is not applied to an R wave immediately before the R wave as a target of an enabling signal for defibrillation.

The above steps can be executed with use of the processing controller, the memory, the comparator, the power source unit, or the like of the defibrillating electrical apparatus 2 or the defibrillating electrical apparatus 70. As to details thereof, reference can be made to description of the necessary conditions for the defibrillating electrical apparatus 2 or the defibrillating electrical apparatus 70.

The steps in the defibrillation signal generation method are not necessarily executed in a single defibrillating electrical apparatus, but may be executed in different apparatuses.

This application claims the benefit of the priority date of Japanese patent application No. 2020-099558 filed on Jun. 8, 2020. All of the contents of the Japanese patent application No. 2020-099558 filed on Jun. 8, 2020 are incorporated by reference herein.

REFERENCE SIGNS LIST

1: Defibrillation catheter system
2: Defibrillating electrical apparatus

3: Electrocardiographic waveform input unit
5: Memory
6: Operation unit
7: Enabling signal generator
8: Processing controller
9: Power source unit
10: Switching unit
10A: First switch
10B: Second switch
11: First connection
12: Second connection
13: Third connection
14: Fourth connection
19: Body surface electrode
20: Catheter
21: First electrode group
22: Second electrode group
23: Third electrode group
25: Tip portion
26: Handle
27: Resin tube
31: First conducting wire
32: Second conducting wire
33: Third conducting wire
34: Fourth conducting wire
35: Fifth conducting wire
36: Sixth conducting wire
37: Seventh conducting wire
40: Electrocardiograph
50: Electrocardiographic waveform
$R_n$: n-th R wave
$R_{n+1}$: (n+1)-th R wave
$R_{n+2}$: (n+2)-th R wave
$51f$: End $51f$ of R wave
$51p$: Peak of R wave
$51s$: Beginning of R wave
70: Defibrillating electrical apparatus
71: A/D converter
72: First processing controller
73: Display unit
74: Comparator
75: Second processing controller
76: Sign status signal generator
$T_1$: First time interval
$T_2$: Second time interval

The invention claimed is:

1. A defibrillating electrical apparatus comprising:
an electrocardiographic waveform input unit configured to be connected to an electrocardiograph and configured to receive an electrocardiographic waveform from the electrocardiograph;
a connector configured to be connected to a defibrillation catheter;
an enabling signal generator configured to generate an enabling signal for enabling voltage application through the connector to the defibrillation catheter for defibrillation;
a comparator; and
a processing controller, wherein
the processing controller is configured to:
calculate a first time interval that is a time interval from an n-th R wave to an (n+1)-th R wave detected in the electrocardiographic waveform and determine whether the first time interval exceeds a first predetermined time period;
when or after the first time interval exceeds the first predetermined time period, cause the enabling signal generator to generate the enabling signal in synchronism with the (n+1)-th R wave;
when or after the first time interval does not exceed the first predetermined time period, calculate a second time interval that is a time interval from the n-th R wave to an (n+2)-th R wave detected in the electrocardiographic waveform and determine whether the second time interval exceeds a second predetermined time period; and
when or after the second time interval exceeds the second predetermined time period, cause the enabling signal generator to generate the enabling signal in synchronism with the (n+2)-th R wave, wherein
the n-th R wave, the (n+1)-th R wave, and the (n+2)-th R wave are detected in this order by the comparator, and n is an integer equal to or greater than one, and
the first predetermined time period and the second predetermined time period are 200 milliseconds or more and 300 milliseconds or less further comprising a power source unit configured to charge and generate the defibrillation voltage to be applied to the defibrillation catheter wherein
the processing controller is configured, when or after the power source unit has completed charging with the defibrillation voltage, to cause the enabling signal generator to generate the enabling signal, so that the defibrillation voltage can be applied through the connector to the defibrillation catheter.

2. The defibrillating electrical apparatus according to claim 1, wherein
the processing controller is configured to determine whether a defibrillation voltage has been applied to an R wave immediately preceding an R wave that is a target of the enabling signal for enabling voltage application, and
when or after the defibrillation voltage has not been applied to the immediately preceding R wave, the enabling signal generator is caused to generate the enabling signal for the R wave.

3. The defibrillating electrical apparatus according to claim 1, wherein
the first predetermined time period and the second predetermined time period are equal to each other.

4. The defibrillating electrical apparatus according to claim 1, wherein
the first time interval corresponds to a time interval from a peak of the n-th R wave to a peak of the (n+1)-th R wave of the electrocardiographic waveform, and
the second time interval corresponds to a time interval from the peak of the n-th R wave to a peak of the (n+2)-th R wave of the electrocardiographic waveform.

5. The defibrillating electrical apparatus according to claim 1, wherein
the first time interval corresponds to a time interval from a time point when waveform height of the n-th R wave of the electrocardiographic waveform exceeds a first predetermined value to a time point when waveform height of the (n+1)-th R wave exceeds the first predetermined value,
the second time interval corresponds to a time interval from a time point when the waveform height of the n-th R wave of the electrocardiographic waveform exceeds the first predetermined value to a time point when waveform height of the (n+2)-th R wave exceeds the first predetermined value, and the first predetermined value is located in terms of waveform height between a beginning and a peak of the R wave.

6. The defibrillating electrical apparatus according to claim 1, wherein
the first time interval corresponds to a time interval from a time point when waveform height of the n-th R wave of the electrocardiographic waveform falls below a second predetermined value to a time point when waveform height of the (n+1)-th R wave falls below the second predetermined value,
the second time interval corresponds to a time interval from a time point when the waveform height of the n-th R wave of the electrocardiographic waveform falls below the second predetermined value to a time point when waveform height of the (n+2)-th R wave falls below the second predetermined value, and
the second predetermined value is located in terms of waveform height between a peak and an end of an R wave.

7. The defibrillating electrical apparatus according to claim 1, wherein
the defibrillating electrical apparatus is configured to generate
a sign status signal for sign impartment to the (n+1)-th R wave when or after the first time interval exceeds the first predetermined time period, and
a sign status signal for sign impartment to the (n+2)-th R wave when or after the second time interval exceeds the second predetermined time period.

8. An intracardiac defibrillation catheter system comprising:
the catheter configured to be inserted into a cardiac cavity, the catheter having a distal end, a proximal end, and a plurality of electrodes provided at a distal portion of the catheter; and
the defibrillating electrical apparatus according to claim 1, configured to apply the defibrillation voltage from the power source unit to the plurality of electrodes.

* * * * *